United States Patent [19]

Decker, Jr. et al.

[11] Patent Number: 4,681,148

[45] Date of Patent: Jul. 21, 1987

[54] TIRE DEFLATION MECHANISM

[76] Inventors: Oscar C. Decker, Jr., 409 Lufberry, Selfridge ANGB, Mich. 48045; Eugene Kleemann, 17390 Juliana, East Detroit, Mich. 48021

[21] Appl. No.: 517,601

[22] Filed: Jul. 27, 1983

[51] Int. Cl.⁴ .................. B60C 23/04; F16K 15/20
[52] U.S. Cl. ................................ 152/431; 137/230
[58] Field of Search ............... 152/415, 431; 137/228, 137/223, 224, 230

[56] References Cited

U.S. PATENT DOCUMENTS

| | | | |
|---|---|---|---|
| 1,539,865 | 6/1925 | Pratt | 137/230 |
| 1,686,659 | 10/1928 | Henemier | 152/431 |
| 2,737,223 | 3/1956 | Plath | 137/230 |
| 4,151,863 | 5/1979 | Stevens et al. | 137/230 |

Primary Examiner—Donald E. Czaja
Assistant Examiner—Ramon R. Hoch
Attorney, Agent, or Firm—Peter A. Taucher; John E. McRae

[57] ABSTRACT

A semi-automatic tire deflation device attachable to a tire filler valve. A spring-urged plunger mechanism within the device is alignable with the filler valve element so that manual depression of the plunger mechanism opens the filler valve to start the tire-deflation process. The plunger has differential areas exposed to pressure forces, whereby reduction of the pressure to a predetermined value allows the spring to return the plunger mechanism to its starting position, thus automatically terminating the tire-deflation process.

2 Claims, 2 Drawing Figures

TIRE DEFLATION MECHANISM

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a vehicle tire deflator, i.e., a mechanism attachable to the filler valve of a vehicle tire to facilitate a tire-deflation operation. Such an operation is sometimes carried out by a military force when it is preparing to move one or more wheeled vehicles over soft terrain. A partially-deflated tire has an enlarged surface area in contact with the terrain so that unit pressure forces (p.s.i.) are relatively small; the tire is less apt to sink into the terrain and thus impede vehicle motion.

Various automatic tire inflation-deflation mechanisms and systems have been devised for adjusting or controlling air pressures within vehicle tires. However such automatic systems are relatively costly to implement into hardware, especially with vehicles having large numbers of tires, e.g., heavy equipment transporters used to transport military tanks or armored personnel carriers. One particular transporter has a total thirty wheel-tire assemblies, fourteen on the tractor and sixteen on the trailer. An automatic inflation-deflation system for such a vehicle would be relatively costly.

It is possible to carry out the tire-deflation operation manually, i.e., to manually depress and hold open the tire valve for a length of time, apply a pressure gage to the valve, and repeat the process until the desired tire pressure is obtained. However such a process is very time-consuming when the vehicle has a large number of tires, e.g. the previously mentioned heavy equipment transporter. Additionally, when the vehicle has some or all of the wheels arranged as dual wheels (two wheels alongside one another at each end of an axle) it is difficult to maintain access to valves on the inner tires in a given dual wheel set. The soldier is required to crawl or crouch in the area behind the outer wheel; reading a tire pressure gage while in a prone or crouched position is time-consuming, difficult and sometimes conducive to reading error.

The present invention is directed to a semi-automatic tire deflation device that can be attached to a tire valve (e.g. by screwing it onto the threaded stem area of the valve). The device is provided with a depressible plunger mechanism that can be operated to automatically open the tire valve and hold it open until the tire has been deflated to a predetermined pressure. For example, where the normal tire pressure is sixty p.s.i. the deflation device can be utilized to reduce the pressure to 30 p.s.i. As previously noted, the device is used primarily when it becomes necessary or desirable to appreciably reduce the tire pressure (i.e., increase the terrain contact area) preparatory to vehicle operation in soft soil.

One advantage of our deflation device is that once the plunger mechanism is operated the deflation operation proceeds automatically, i.e., the soldier can set the plunger and move on to the next tire without waiting for the first tire to deflate. When large numbers of tires are to be partially deflated there can be a considerable time savings.

Another advantage of our device is that the final pressure in each tire is substantially the desired pressure. Final pressure is achieved automatically without need for human readout of a pressure gage. Possibility for error in the final pressure is greatly minimized.

THE DRAWINGS

Figure 1:
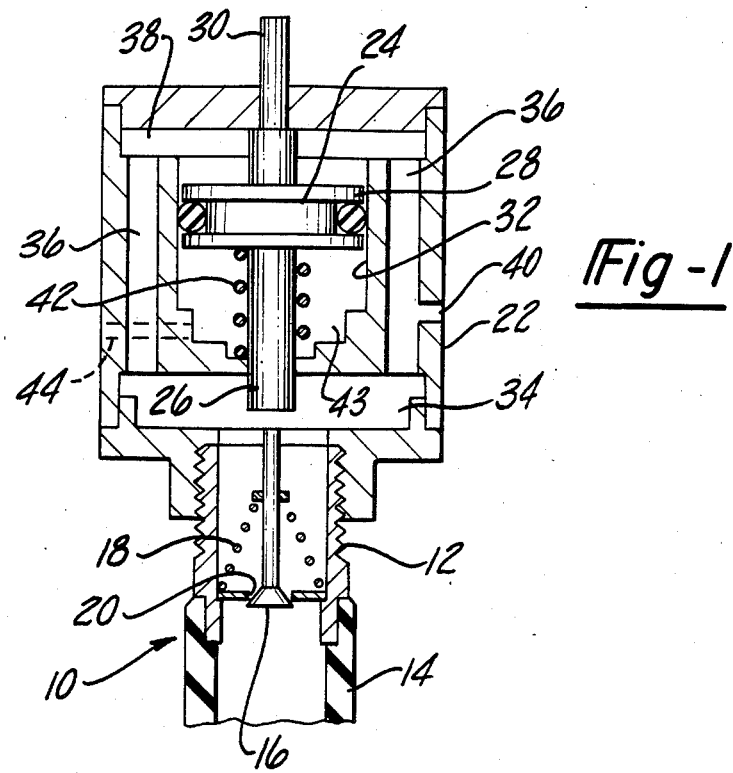
FIG. 1 is a sectional view taken through one embodiment of our invention.

FIG. 1 shows a conventional tire filler valve 10 that includes an externally threaded hollow stem 12 extending from an elastomeric duct 14 that connects to a tire (not shown). A depressible check valve element 16 is normally urged by tire air pressure and a light coil spring 18 to a position closing the flow opening 20.

FIG. 1 represents the normal condition of the tire filler valve, i.e., a closed condition wherein air pressure acts on the unbalanced poppet valve surface areas to keep the valve closed. During a tire-filling operation (or tire-deflation operation) valve element 16 is in the FIG. 2 flow-open condition.

Our invention is directed to an add-on deflation device for the tire-filler valve. Our device includes a hollow body or casing 22 having a screw-on connection with the stem 12 threads. A plunger 24 is slidably disposed within body 22 so that when the body is initially screwed down onto stem 12 the lower end of plunger 24 is spaced a slight distance from valve element 16, e.g., one sixteenth inch. Plunger 24 includes a lower rod portion 26, an intermediate piston portion 28, and an upper pin portion 30.

Piston 28 is disposed within a cylindrical chamber 32 that communicates with an overhead space 38. A series of cylindrical passages 36 provide communication between space 38 and a space 34 below cylinder 32. In the FIG. 1 position space 34 above valve 16 is depressurized. However, when pin 30 is depressed (by manual thumb pressure) to the FIG. 2 position rod 26 moves downwardly to engage valve element 16 and move same to its flow-open position. Pressurized air then flows upwardly through valve opening 20 into space 34. Passages 36 transmit the pressurized air to superjacent space 38 that communicates with the mouth of cylindrical chamber 32. A force proportional to the air pressure acts downwardly on the upper face of piston 28 to keep plunger 24 and valve 16 in the FIG. 2 positions. The human operator can immediately remove his thumb from plunger 30, after which the pneumatic pressure on the upper face of piston 28 continues to hold the components in the FIG. 2 position. Some of the air admitted to the rightmost passage 36 is automatically exhausted to the ambient atmosphere through a vent opening 40. Opening 40 is sized to have a lesser flow area than valve opening 20 so that passages 36 and space 38 are maintained in pressurized conditions sufficient to maintain a representative pneumatic pressure on the upper face of piston 28.

The mechanism includes a compression coil spring 42 in space 43 immediately below piston 28. Spring 42 is sized to develop a known upward force on piston 28. A small vent passage 44 connects space 43 with the external atmosphere so that space 43 is always at normal atmospheric pressure (i.e., isolated from the pressurized air stream) whatever the position of piston 28.

Figure 2:
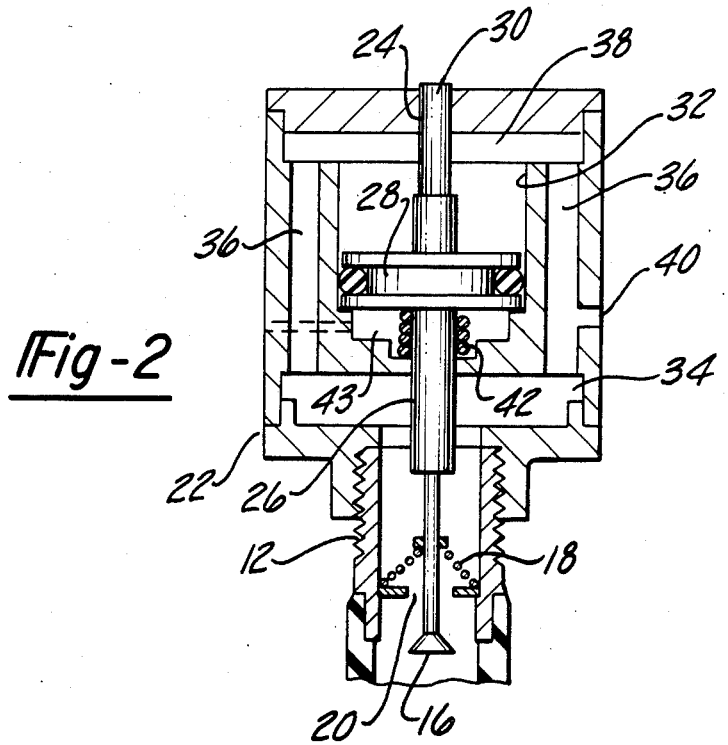
FIG. 2 is a sectional view in the direction of FIG. 1, but taken with the mechanism in an actuated condition.

Our add-on device is designed so that when plunger 24 is manually moved to the FIG. 2 position the tire will automatically be depressurized through vent opening 40 until the pressure drops to some pre-determined value; when that pressure is reached the spring forces and pneumatic forces within the add-on device will be such that plunger 24 will snap back to the FIG. 1 condition, thereby enabling valve element 16 to automatically close and thus halt the tire deflation operation.

Control of the deflation action is provided by spring 42 and the unbalanced surface areas on plunger 24 (i.e., the relatively large upper surface are on piston 28 versus the relatively small surface area on the lower end of rod 26). Piston 28 and rod 26 may be considered as a differential area plunger means. In the FIG. 2 condition the forces acting upwardly on plunger 24 are primarily the spring 42 force plus the pneumatic force acting on the lower end of rod 26. The force of spring 18 is relatively small and can be disregarded. The forces acting downwardly on plunger 24 are the forces due to the pneumatic pressure on the upper face of piston 28.

For illustration purposes, we will assume that normal tire pressure is sixty p.s.i., and that it is desired to have the final deflation pressure at or near thirty p.s.i. If the upper surface of piston 28 has an area of 0.15 square inch, and the lower end surface or rod 26 has an area of 0.005 square inch, spring 42 would be sized to develop a force of about five pounds. At the 60 p.s.i. starting condition the downward force on piston 28 would be about 9 pounds (60×0.15); the upward force would be 5 pounds due to spring 42 plus 0.03 pounds (60×0.005) due to the pneumatic force on rod 26. At the 30 p.s.i. desired end condition the downward force on piston 28 would be about 4.5 pounds (30×0.15); the upward force would be 5 pounds due the spring plus 0.015 pounds (30×0.005) due to the pneumatic force on rod 26.

It will be seen that when the pressure is 60 p.s.i. plunger 24 is maintained in the FIG. 2 depressed condition for deflating the tire through vent opening 40. When the pressure drops to some lower value in the neighborhood of 30 p.s.i. spring 42 is able to move plunger 24 upwardly to the FIG. 1 valve-closed condition. This action occurs automatically without human surveillance or attention. All that is necessary is that the human technician start the operation, i.e., by depressing plunger 24 via thumb pressure on pin 30. The human technician can move on to the next tire without waiting for the tire deflation action to proceed to a conclusion.

The invention is intended to be used primarily with vehicles having large numbers of tires. Vehicles of particular interest are heavy duty multi-wheeled transporter vehicles used by the military to transport disabled tanks across rough terrain. It is contemplated that our add-on deflation devices would be screwed onto the filler valves of individual tires on the vehicle; when it became necessary for the transporter to negotiate soft terrain (especially with a heavy tank loaded onto the trailer section of the transporter) the plungers on some or all of the add-on deflation devices would be sequentially depressed to initiate the tire deflation process.

I wish it to be understood that we do not desire to be limited to the exact details of construction shown and described for obvious modifications will occur to a person skilled in the art.

We claim:

1. In association with a road vehicle having a plurality of wheels equipped with pneumatic tires, each tire having a hollow stem containing a depressible check valve therein for tire-inflation purposes: the improvement comprising a deflator mountable on a stem of each tire on the vehicle, the deflators being collectively used to lower the tire pressures to predetermined low values when it is desired to operate the vehicle on soft terrain; each deflator comprising a hollow body mountable on the associated stem; internal wall structure within the hollow body defining a cylindrical chamber (32); differential area plunger means (24) within the hollow body located to align with the aforementioned check valve when the hollow body is in its mounted position; said plunger means comprising a piston (28) slidably disposed in said cylindrical chamber, a manually depressible pin (30) extending from one face of the piston outwardly through the hollow body, and a rod (26) extending from the other face of the piston through a wall of the cylindrical chamber and toward the aforementioned check valve: the cross sectional area of the piston being greater than the cross sectional area of the rod; spring means within the cylindrical chamber acting to move the plunger means away from the check valve; and a plurality of air passages (36) within the hollow body operable to transmit pressurized air from the check valve to the cylindrical chamber and thence to said one face of the piston; said air passages being spaced radially outward from the cylindrical chamber without going through the plunger means, whereby said one face of the piston is undiminished in area by reason of the passages; said one face of the piston having sufficient area that when the air pressure has a value higher than the predetermined low value the air pressure forces on said one piston face are effective to bias the plunger means to a position wherein the rod holds the check valve open; said spring means being sized so that when the air pressure drops to a predetermined low value the spring means is effective to substantially balance the air pressure forces on the plunger means, whereby the plunger means then offers minimal resistance to movement of the check valve to its closed position.

2. The combination of claim 1: the cross sectional area of the piston being about 0.15 square inch; the cross sectional area of the rod being about 0.005 square inch; the spring means being sized to develop a force of about five pounds.

* * * * *